United States Patent Office 3,775,434
Patented Nov. 27, 1973

3,775,434
PROCESS FOR PREPARING A 3,4,9,10-PERYLENE-TETRACARBOXYLIC ACID DIANHYDRIDE PIGMENT
Ernst Spietschka, Oberauroff, Taunus, and Josef Landler, Hofheim, Taunus, Germany, assignors to Farbwerke Hoechst Aktiengesellschaft vormals Meister Lucius & Bruning, Frankfurt am Main, Germany
No Drawing. Filed May 20, 1971, Ser. No. 145,525
Claims priority, application Germany, May 23, 1970, P 20 25 289.5
Int. Cl. C07d 7/46
U.S. Cl. 260—345.2     13 Claims

ABSTRACT OF THE DISCLOSURE

Finishing process for improving the pigment properties of 3,4,9,10-perylene-tetracarboxylic acid dianhydride by precipitating the free acid thereof from an aqueous alkaline solution of a salt of the acid, heating the precipitated acid in an organic solvent at elevated temperature to form the dianhydride and isolating the dianhydride.

---

It is known that 3,4,9,10-perylene-tetracarboxylic acid dianhydride can be used for the dyeing of lacquers and plastic materials (cf. Swiss Pats. 384,204 and 369,246). Several processes are known for converting the industrially accessible 3,4,9,10-perylene-tetracarboxylic acid dianhydride into the form of a pigment, for example dissolution and precipitation from sulfuric acid, grinding processes and recrystallization from solvents. Besides the unsatisfactory tinctorial strength and purity of shade of the pigments so obtained, these processes are rather expensive, because they require an additional process step. In DOS 1,806,403 (published German patent application), it has been proposed to combine the alkaline solution of a salt of 3,4,9,10-perylene-tetracarboxylic acid in the presence of a dispersing agent at elevated temperature with organic or inorganic acids. The 3,4,9,10-perylene-tetracarboxylic acid dianhydride thereupon precipitates in the form of a pigment.

Now, we have found that a 3,4,9,10-perylene-tetracarboxylic acid dianhydride pigment having improved properties can be obtained by precipitating with an acid free 3,4,9,10-perylene-tetracarboxylic acid from an aqueous solution of an alkali metal salt or tertiary amine salt of perylene-3,4,9,10-tetracarboxylic acid at temperatures between about −20° C. and +30° C., if desired in the presence of dispersing agents or organic solvents, preferably however, without additions, and heating the suspension so obtained in the presence of an organic solvent to temperatures in the range from 35° C. to 200° C. in order to convert the acid into the corresponding dianhydried and isolating in the usual manner the pigment so obtained.

As the starting material, it is advantageous to use the purified alkaline solution obtained in the preparation of 3,4,9,10-perylene-tetracarboxylic acid (cf. Bios Final Report 1484); it is also possible to start from pure 3,4,9,10-perylene-tetracarboxylic acid dianhydride and to prepare therefrom an aqueous salt solution.

As salts of perylene-tetracarboxylic acid, in particular the sodium or potassium salts are used. It is unimportant with which alkaline agents the alkaline solution is being prepared. It is preferred to use potassium hydroxide. Suitably, the concentration of the aqueous alkaline salt solution of the perylene-tetracarboxylic acid is at about 2.5%.

The process of the invention is effected by combining the aqueous alkiline solution of an alkali metal salt of perylene-tetracarboxylic acid, while stirring, at temperatures in the range of from −20° C. to +30° C., preferably 5 to 20° C., with an acid, whereupon the perylene-tetracarboxylic acid precipitates. The precipitation can be realized with any desired mineral or organic acids which are stronger than the perylene-tetracarboxylic acid itself. Examples of such acids, are hydrochloric acid, sulfuric acid, phosphoric acid, nitric acid, or lower aliphatic carboxylic acids such as formic acid, or aromatic sulfonic acids such as benzene- or p-toluene-sulfonic acid. It is preferred to use hydrochloric or sulfuric acid. In order to avoid local overheatings, these acids are preferably used in the form of aqueous solutions having a strength of 10–50%. Furthermore, it is possible, to add these acids in the form of solutions in organic solvents. In any case the treatment with the acid is effected in such a manner that the perylene-tetracarboxylic acid is precipitated and not its dianhydride.

The precipitated or thereafter isolated free perylene-tetracarboxylic acid is then treated with an organic solvent, suitably at a temperature in the range of from 35° C. to 200° C., preferably between 120° C. and 135° C., in a weakly acidic or neutral medium. During this time, it is of advantage to stir the suspension. The duration of the treatment with the solvent is determined above all by the temperature used and by the solvent used. The treatment with solvent is carried out until the total amount of perylene-tetracarboxylic acid is converted into the corresponding dianhydride. In general, a period of time of about 3 to 6 hours is required for this reaction.

The solvent may be added in various process steps. Thus, it is possible to add the solvent to the alkaline solution of the salt of perylene-tetracarboxylic acid before the addition of the acid. This mode of carrying out the process is especially suitable if the organic solvent added is miscible with water. Furthermore, it is possible to add the organic solvent simultaneously with the acid or to add a solution of the acid in an organic solvent. This mode of carrying out the process is suitable only if the solvent used is miscible with water. Finally, it is also possible to add the organic solvent after the perylene-tetracarboxylic acid has precipitated upon acidification of the aqueous medium. This mode of carrying out the process is used in particular if the organic solvent is immiscible with water. Of course, it is also possible to combine the two aforedescribed modes of operation.

The quantity of solvent used must be such that a stirrable paste is formed and that all dyestuff particles come into contact with the solvent. Depending on the type, the solvent is used in a 5–30 fold quantity, preferably the 20 fold quantity o fthe dyestuff contained in the suspension (dry basis).

As organic solvents, there may practically be used all organic liquids understood under this term and which do not dissolve, or to an insignificant degree only, the dianhydride of the perylene-tetracarboxylic acid under the conditions of the process. In particular, there may be used aliphatic and cycloaliphatic alcohols, ketones, esters of lower carboxylic acids with lower alcohols, aliphatic and aromatic hydrocarbons, their nitro- and halogeno-derivatives, phenols, and acid amides. Examples of such solvents are: acetone, acetic acid ethyl ester, ethanol, xylene, chlorobenzene, phenol and dimethylformamide.

If the temperature used during the treatment with solvent is above the boiling point of the mixture, the treatment is effected under pressure.

Working up of the pigments so prepared is carried out in the usual manner. Thus, the pigment so prepared can be isolated by filtration or centrifugation. If water-soluble solvents have been used, it is washed with water only and dried. If solvents which are not miscible with water have been used, it is suitable to wash the pigment previously with a low-boiling organic solvent such as methanol, ethanol or acetone, in order to completely remove the solvent used in the treatment with solvent. If solvents have been used which are immiscible with water, they can be removed prior to the isolation of the pigment by steam distillation.

Inversely, the water can be eliminated from the aqueous suspension of the perylene-tetracarboxylic acid by carrier steam distillation with a solvent which is immiscible with water, whereby the dianhydride is formed.

If solvents which are immiscible with water are used, it may be of advantage to operate in the presence of surface-active agents.

The 3,4,9,10-perylene-tetracarboxylic acid dianhydride pigment obtained according to the invention dyes lacquers clear red shades which have an excellent tinctorial strength. The coatings prepared with them have excellent fastness to weather, to light and to over-varnishing. This pigment is also suitable for the dyeing of plastic materials, for example polystyrene, polyvinyl chloride, especially for colouring polyacrylonitrile according to the wet spinning process.

The pigment prepared according to the invention is superior to the product obtained according to the process described in DOS 1,806,403 (published German application), especially with regard to the fastness to weather.

The following examples illustrate the invention:

EXAMPLE 1

20 g. of perylene-3,4,9,10-tetracarboxylic acid anhydride were dissolved, while stirring, in 800 cc. of water with 14 g. of potassium hydroxide, in the form of the potassium salt. It was found to be suitable to heat to 60°–70° C. After the clear solution of perylene-3,4,9,10-tetracarboxylic acid potassium salt had cooled, 28 g. of hydrochloric acid having a strength of 37% were allowed to run in at 5° C. 200 g. of xylene were added to the perylene-3,4,9,10-tetracarboxylic acid suspension and the whole was then heated in a closed stirring vessel for 5 hours to 130°–135° C. The xylene was then removed by steam distillation. The perylene-3,4,9,10-tetracarboxylic acid dianhydride so formed was isolated by filtration, washed with water and dried at 60° C. in a vacuum drier. Yield of dyestuff: 20 g.

The pigment so obtained was found to dye plasticizer-containing polyvinyl chloride red shades having excellent properties of fastness.

EXAMPLE 2

800 g. of purified aqueous solution of the potassium salt of perylene - 3,4,9,10 - tetracarboxylic acid (2.5% strength, referred to the dianhydride of the acid and obtained as described in Bios Final Report 1484), were rendered acidic, while stirring, at 5° C., by means of 28 g. of hydrochloric acid having a strength of 37%. The free perylene-3,4,9,10-tetracarboxylic acid that had precipitated was isolated by suction-filtration and washed with water to neutrality. The weight of the aqueous-wet filter cake was about 100 g. Then, 300 g. of chlorobenzene were introduced into a heatable stirring vessel, the wet filter cake was introduced and the whole was heated to the boiling temperature of the water, whereupon the total amount of water was removed by distillation in about 3 hours. The temperature was then raised to the boiling temperature of the chlorobenzene and the treatment with solvent was completed after boiling for 2 hours. The perylene-3,4,9,10-tetracarboxylic acid dianhydride thus formed was isolated by suction-filtration, preferably at 60° C., washed with methanol until it was free from chlorobenzene and dried in a vacuum drier at 40° C. Yield of dyestuff: 20 g.

With this dyestuff, which was obtained in the form of soft grains, clear red shades could be produced on soft polyvinyl chloride and on stoving lacquers. The latter were distinguished by outstanding fastness to light and to weather.

EXAMPLE 3

100 g. of aqueous wet filter cake of perylene-3,4,9,10-tetracarboxylic acid having a strength of 20% and prepared according to Example 2 were heated for 5 hours to 150° C. with 400 g. of ethanol in a closed stirring vessel. After cooling, the product, which had been converted into the dianhydride, was isolated by suction-filtration, washed with 50 g. of ethanol and dried at 40° C. in a vacuum drier. Yield of dyestuff: 20 g.

It was found that if this finely dispersed red pigment dyestuff was incorporated into soft polyvinyl chloride or stoven lacquers, clear red shades having high intensity of shade, purity and fastness were obtained.

We claim:

1. A process for improving the pigment properties of 3,4,9,10-perylene-tetracarboxylic acid dianhydride which comprises heating 3,4,9,10-perylene-tetracarboxylic acid in an organic solvent at a temperature in the range of about 35° C. in about 200° C. to form 3,4,9,10-perylene-tetracarboxylic acid dianhydride, and isolating said dianhydride.

2. A process according to claim 1 wherein said 3,4,9,10-perylene-tetracarboxylic acid is heated at a temperature in the range of about 120° C. to about 135° C.

3. A process according to claim 1 wherein said organic solvent is an organic liquid in which said 3,4,9,10-perylene-tetracarboxylic acid dianhydride is substantially insoluble.

4. A process according to claim 3 wherein said organic solvent is acetone, acetic acid ethyl ester, ethanol, xylene, chlorobenzene, phenol or dimethylformamide.

5. A process according to claim 1 wherein the amount of said organic solvent is about 5 to about 30 times the amount of said 3,4,9,10-perylene-tetracarboxylic acid.

6. A process according to claim 1 which further comprises precipitating 3,4,9,10-perylene-tetracarboxylic acid from a solution of a salt of 3,4,9,10-jerylene-tetracarboxylic acid in an aqueous alkaline medium at a temperature in the range of about −20° C. to about 30° C. in the presence of an acid, and then heating said precipitate acid in said organic solvent.

7. A process according to claim 6 wherein said 3,4,9,10-perylene-tetracarboxylic acid is precipitated at a temperature in the range of about 5° C. to about 20° C.

8. A process according to claim 6 wherein said 3,4,9,10-perylene-tetracarboxylic acid precipitate is isolated from said aqueous alkaline solution.

9. A process according to claim 6 wherein said acid is a mineral acid or an organic acid stronger than said 3,4,9,10-perylene-tetracarboxylic acid.

10. A process according to claim 9 wherein said acid is hydrochloric, sulfuric, nitric, phosphoric, lower aliphatic carboxylic or aromatic sulfonic acid.

11. A process according to claim 6 wherein the concentration of said salt of 3,4,9,10-perylene-tetracarboxylic acid in said aqueous alkaline solution is about 2.5%.

12. A process according to claim 6 wherein said salt of 3,4,9,10-perylene-tetracarboxylic acid is an alkali metal salt or a tertiary amine salt.

13. A process according to claim 12 wherein said alkali metal is potassium or sodium.

References Cited

UNITED STATES PATENTS

| | | | |
|---|---|---|---|
| 1,506,545 | 8/1924 | Schmidt et al. | 260—345.2 X |
| 1,917,153 | 7/1933 | Pongratz | 260—345.2 |
| 3,628,976 | 12/1971 | Stocker | 260—345.2 |

JOHN M. FORD, Primary Examiner

U.S. Cl. X.R.

8—4; 106—288 Q